Patented Feb. 13, 1951

2,541,142

UNITED STATES PATENT OFFICE 2,541,142

UNSATURATED ETHER-ESTERS OF POLYHYDRIC ALCOHOLS

Morris Zief and Elias Yanovsky, Philadelphia, Pa., assignors to United States of America as represented by the Secretary of Agriculture No Drawing. Application April 16, 1948, Serial No. 21,545

7 Claims. (Cl. 260—234)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to ether-esters of polyhydric alcohols and more particularly to such ether-esters containing unsaturated ether groups and unsaturated ester groups. The invention has among its objects the provision of such compositions of matter and methods for their preparation. Other objects and advantages will be apparent from the description of the invention.

We have found that unsaturated ethers of polyhydric alcohols which contain unsubstituted hydroxyl groups can be converted to the unsaturated ether-ester by reacting them with an unsaturated acylating agent, and that the resulting unsaturated ether-esters of the polyhydric alcohols possess valuable properties which render them useful in the manufacture of coating compositions, plastics and similar products.

Unsaturated ethers of polyhydroxy alcohols, such as the polyallyl and polymethallyl ethers of carbohydrates and of other polyhydric compounds, like cellulose, starch, sucrose, mannitol, pentaerythritol, glycerol and the like, are polymerizable compounds which are useful as thermosetting resins. Many of these compounds can be used, for instance, as film-forming materials or plastic compositions which, on polymerization, yield products that are highly resistant to the action of heat, solvent and other reagents.

Some of these polymerizable, unsaturated ethers of polyhydric compounds, for example, the allyl ethers of starch and of cellulose are solids; others like the polyallyl ethers of sucrose are liquids. When allyl starch, for instance, is applied from a solution in a volatile solvent, on the surface of wood or other material the resulting coating becomes dry (tack-free) as soon as the solvent has evaporated, after which the polymerization of the solid residue proceeds slowly at ordinary temperature and faster at elevated temperature. Liquid, polymerizable, unsaturated ethers of polyhydric compounds such as polyallyl sucrose and others, when utilized either as such, or in the form of solutions, will remain tacky for many hours, thus collecting dust and dirt on the coated surface. This defect can be remedied by blowing air or oxygen through the liquid polymerizable ether, preferably at elevated temperature, thereby gradually increasing the viscosity of the treated material and converting it to a product which is more rapidly polymerized to a dry, non-tacky substance. The progress of this viscosity increasing treatment, which must be stopped before the formation of a gel occurs, can be followed either by measuring the viscosity at certain intervals or, which is simpler, by measuring the refractive index of the treated material which increases with the increase in viscosity.

The process of blowing air or oxygen through the liquid ether at elevated temperature is time consuming and adds to the cost of these products so that any procedure that will shorten the duration of the process facilitates the utilization of the liquid polymerizable ether of polyhydric compounds as coating compounds and also for other purposes. Ethers of polyhydric alcohols wherein the unsaturated ether groups are alkyl substituted allyl groups, such as the methallyl or crotyl ethers, polymerize even slower than the corresponding allyl ethers. Thus, under the same conditions of temperature (100° C.) and flow of the oxygen containing gaseous medium (7.5 liters of oxygen per hour) an allyl ether of sucrose (containing approximately 6.7 allyl groups per molecule) is converted to a gel in 205 minutes, while the corresponding methallyl and crotyl ethers of sucrose gelled in 465 minutes and 2,175 minutes respectively. Likewise, under similar conditions gelation is retarded when some of the hydroxyl groups of the polyhydric alcohol are substituted by non-polymerizable ether groups derived from saturated aliphatic or aromatic alcohols, like those present in the mixed ethers described by Hamilton and Yanovsky in their application, Serial No. 656,952, Patent No. 2,463,869. Thus, under the aforementioned conditions of exposure to an oxygen containing gaseous medium an allyl ether of sucrose containing 6.7 allyl groups per molecule gelled in 205 minutes, while a mixed ether of sucrose, containing 6.7 allyl groups and one butyl group per molecule gelled in 300 minutes, and a mixed sucrose ether with 6.7 allyl groups and one benzyl group gelled in 590 minutes. The mixed ethers of polyhydric alcohols containing unsaturated as well as saturated ether groups of the type described in the above-mentioned application of Hamilton and Yanovsky, while less advantageous with respect to the conditions required to convert them into partially polymerized, viscous, readily drying products, possess certain advantages over ethers containing only unsaturated ether groups and free hydroxyle and are more water resistant due to elimination of free hydroxyl groups.

We have found that the polyhydric alcohol unsaturated ether-esters of our invention containing unsaturated ether and unsaturated ester groups polymerize more rapidly than the corresponding unsaturated ethers of polyhydric alcohols. We have further found that polymerization of unsaturated ethers of polyhydric alcohols and of mixed ethers of polyhydric alcohols containing unsaturated as well as saturated ether groups is promoted by addition of the products of this invention to these polymerizable ethers of polyhydric alcohols.

According to the method of this invention unsaturated ether-esters of polyhydric alcohols are produced by reacting an unsaturated ether of a polyhydric alcohol containing at least one free hydroxyl group in the polyhydric alcohol radical with an unsaturated acylating agent, at reaction temperature and preferably in the presence of pyridine or similar solvent. The resulting unsaturated ether-ester of the polyhydric alcohol formed by interaction of the acylating agent with the free hydroxyl group or groups of the polyhydric alcohol radical can be isolated from the reaction mixture by any suitable means, for example, solvent extraction and distillation.

In general our process is applicable to unsaturated ethers of polyhydric alcohols containing at least one free hydroxyl group in the polyhydroxy alcohol radical. Suitable ethers of polyhydric alcohols include, for example, the partially etherified unsaturated ethers of polyhydric aliphatic alcohols containing from 2 to 8 hydroxyl groups, such as glycols, like ethylene glycol, 1,3-butylene glycol, and dipropylene glycol; glycerol, pentaerythritol, pentitols, glucose and methyl glucoside; hexitols, like mannitol, sorbitol and inositol; dipentaerythritol and disaccharides such as sucrose and other similar polyhydric alcohols wherein at least one hydroxyl group is replaced by an unsaturated ether group containing the radical of an aliphatic, monoolefinic alcohol, preferably an olefinic alcohol containing from 3 to 4 carbon atoms such as allyl, methallyl, and crotyl alcohols or their halogen substitution products, like chloroallyl alcohols.

These partially etherified unsaturated ethers of polyhydric alcohols can be prepared, for example, by reacting the polyhydric alcohol with the necessary amount of an alkenyl halide such as allyl, methallyl, chloroallyl, or crotonyl chloride or bromide in the presence of aqueous sodium hydroxide essentially according to procedures described by Nichols and Yanovsky, J. Am. Chem. Soc. 67, 46; 66, 1625; Talley, Vale and Yanovsky, ibid. 67, 2037; Nichols, Wrigley and Yanovsky, ibid. 68, 2020.

Unsaturated acylating agents adapted for use in carrying out the process of our invention are the anhydrides and acyl halides of aliphatic, olefinic, monounsaturated, monocarboxylic acids containing from 3 to 4 carbon atoms, such as acrylic, methacrylic, crotonic and haloacrylic acids. Suitable acylating agents include for instance, acrylic anhydride, methacrylic anhydride, acrylyl, methacrylyl, chloracrylyl chlorides, and so forth.

The following examples are given as illustrative embodiments of a manner in which the process of our invention may be carried out in practice.

EXAMPLE I

Preparation of the methacrylyl ester of sucrose allyl ether

To 74 g. of allyl sucrose (containing 6.7 allyl groups) dissolved in 150 cc. of pyridine was added at 60°–65° C., dropwise with stirring, 75.5 g. of redistilled methacrylic anhydride. The mixture was then stirred at 70° C. for 3½ hours, allowed to stand at room temperature overnight, and then poured, with stirring, into ice water. The water layer was decanted and the gummy product washed several times with water and dissolved in chloroform. The chloroform solution was washed four times with water, dried over anhydrous sodium sulfate and the solvent evaporated under reduced pressure. The residue, consisting of methacrylyl ester of sucrose allyl ether was a viscous yellow liquid, $n_D^{25°}=1.4788$. Analysis: 0.04 OH groups, 6.7 allyl groups, 1.2 methacrylyl groups.

EXAMPLE II

Preparation of the methacrylyl ester of mannitol allyl ether

To 64.5 g. of allyl mannitol (containing 4.2 allyl groups) dissolved in 110 cc. of pyridine, was added at 50°–60° C. dropwise and with stirring, 67.1 g. of freshly distilled methacrylic anhydride. The mixture was heated at 70° C. for 4 hours, allowed to stand overnight at room temperature and then poured, with stirring, into ice water. The organic layer was taken up in chloroform, the chloroform solution was washed five times with water, treated with decolorizing charcoal and dried over anhydrous sodium sulfate. The solvent was then evaporated under reduced pressure. The residue consisting of methacrylyl ester of mannitol allyl ether was a light brown, clear liquid, $n_D^{25}=1.4700$. Analysis: 0.6 hydroxyl groups, 4.2 allyl groups, 1.2 methacrylyl groups.

Allyl ethers of sucrose (2 to 7 allyl groups) and of mannitol (2 to 5 allyl groups) can be converted to the corresponding methacrylyl esters of the allyl ethers by the procedure of the above examples using equivalent amounts of the acid anhydride.

The gelation time of the unsaturated ether-esters of polyhydric alcohols and of mixtures thereof with unsaturated polyethers was determined as described by Nicohls et al., J. Am. Chem. 68, 2020. Some of the results thus obtained are shown in the following table.

| Product | Composition | Gelation Time |
|---|---|---|
| | | Minutes |
| 1 | Allyl ether of sucrose (6.2 allyl groups) | 135 |
| 2 | Methacrylyl ester of allyl ether of sucrose (6.2 allyl and 1.3 methacrylyl groups) | 8 |
| 3 | Sucrose allyl ether (6.7 allyl groups) | 205 |
| 4 | Methacrylyl ester of sucrose allyl ether (6.7 allyl and 1.25 methacrylyl groups) | 78 |
| 5 | Mixture of (3) and (4), equal parts by weight | 146 |
| 6 | Mannitol allyl ether (4.2 allyl groups) | 265 |
| 7 | Methacrylyl ester of mannitol allyl ether (4.2 allyl and 1.2 methacrylyl groups) | 14 |
| 8 | Mixture of (6) and (7), equal parts by weight | 136 |
| 9 | Mixture of (6) and (7); 75 and 25 percent by weight, respectively | 205 |

The above tabulated data show that the unsaturated ether-esters polymerize much more rapidly than the corresponding ethers, and that the gelation time of mixtures can be controlled within certain limits by using varying proportions of the constituents.

Other unsaturated ether-esters of polyhydric alcohols display analogous characteristics.

Having thus described our invention, we claim:

1. An ether-ester of an aliphatic alcohol having from 2 to 8 hydroxyl groups, and containing in its molecule an aliphatic, monoolefinic ether group having from 3 to 4 carbon atoms and an ester group containing the acyl radical of an aliphatic, monoolefinic monocarboxylic acid having from 3 to 4 carbon atoms.

2. A methacrylyl ester of an allyl ether of sucrose.

3. A methacrylyl ester of an allyl ether of mannitol.

4. The process comprising heating an ether of an aliphatic alcohol containing from 2 to 8 hydroxyl groups wherein at least one of these hydroxyl groups is free of substituents and containing at least one ether group having from 3 to 4 carbon atoms and containing the grouping

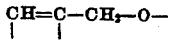

with an acylating agent containing the acyl radical of an aliphatic monocarboxylic acid having from 3 to 4 carbon atoms and containing the grouping

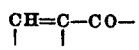

at reaction temperature and for a length of time sufficient to effect substantially complete acrylation of said free hydroxyl groups.

5. The method of converting a polymerizable allyl ether of a polyhydric alcohol into a product having a higher polymerization rate, comprising heating a partially allylated polyhydric alcohol containing from 2 to 8 hydroxyl groups wherein at least one of these hydroxyl groups is free of substituents, with methacrylic anhydride at reaction temperature and for a length of time sufficient to effect substantially complete acylation of said free hydroxyl groups.

6. The method of claim 5 wherein the allyl ether is allyl sucrose.

7. The method of claim 5 wherein the allyl ether is allyl mannitol.

MORRIS ZIEF.
ELIAS YANOVSKY.

REFERENCES CITED

The following references are of record in the file of this patent:

UNITED STATES PATENTS

| Number | Name | Date |
|---|---|---|
| 2,463,869 | Hamilton et al. | Mar. 8, 1949 |